United States Patent
Maschirow et al.

(10) Patent No.: US 8,411,283 B2
(45) Date of Patent: Apr. 2, 2013

(54) METHOD FOR THE MEASUREMENT OF THE STOCK OF A GEAR

(75) Inventors: Boris Maschirow, Berlin (DE); Frank Reichel, Berlin (DE); Volker Zenker, Berlin (DE)

(73) Assignee: Niles Werkzeugmaschinen GmbH, Berlin (DE)

( * ) Notice: Subject to any disclaimer, the term of this patent is extended or adjusted under 35 U.S.C. 154(b) by 348 days.

(21) Appl. No.: 12/851,629

(22) Filed: Aug. 6, 2010

(65) Prior Publication Data

US 2011/0032538 A1 Feb. 10, 2011

(30) Foreign Application Priority Data

Aug. 8, 2009 (DE) .................. 10 2009 036 776

(51) Int. Cl.
*G01B 11/24* (2006.01)
(52) U.S. Cl. ....................................... 356/601; 356/620
(58) Field of Classification Search .................. 356/601, 356/620
See application file for complete search history.

(56) References Cited

U.S. PATENT DOCUMENTS

| 4,373,804 A | 2/1983 | Pryor |
| 4,547,674 A * | 10/1985 | Pryor et al. .............. 250/559.23 |
| 7,755,771 B2 * | 7/2010 | Komori et al. ................ 356/601 |
| 2010/0138006 A1 * | 6/2010 | Mies et al. ..................... 700/57 |

FOREIGN PATENT DOCUMENTS

| EP | 1607713 A1 | 12/2005 |
| JP | 57158506 A | 9/1982 |

* cited by examiner

*Primary Examiner* — Roy M Punnoose
(74) *Attorney, Agent, or Firm* — Lucas & Mercanti, LLP

(57) ABSTRACT

A method for the measurement of the stock of a gear with an axis of rotation which has to be finished in the hardened state, wherein the gear has a gearing with a plurality of teeth at its outer and/or inner circumference and wherein the teeth have, compared with the finished geometry, a stock on their tooth flanks. To carry out a reliable measurement of the stock the invention proposes that the position of the surface of the tooth flank with the stock is detected by using optical distance measurement by means of a distance sensor, wherein a light beam is directed by the distance sensor onto the surface, wherein the light beam is guided onto the surface in such a way that it is perpendicular to the axis of rotation or that it is parallel to this direction.

8 Claims, 3 Drawing Sheets

METHOD FOR THE MEASUREMENT OF THE STOCK OF A GEAR

Figure 1:
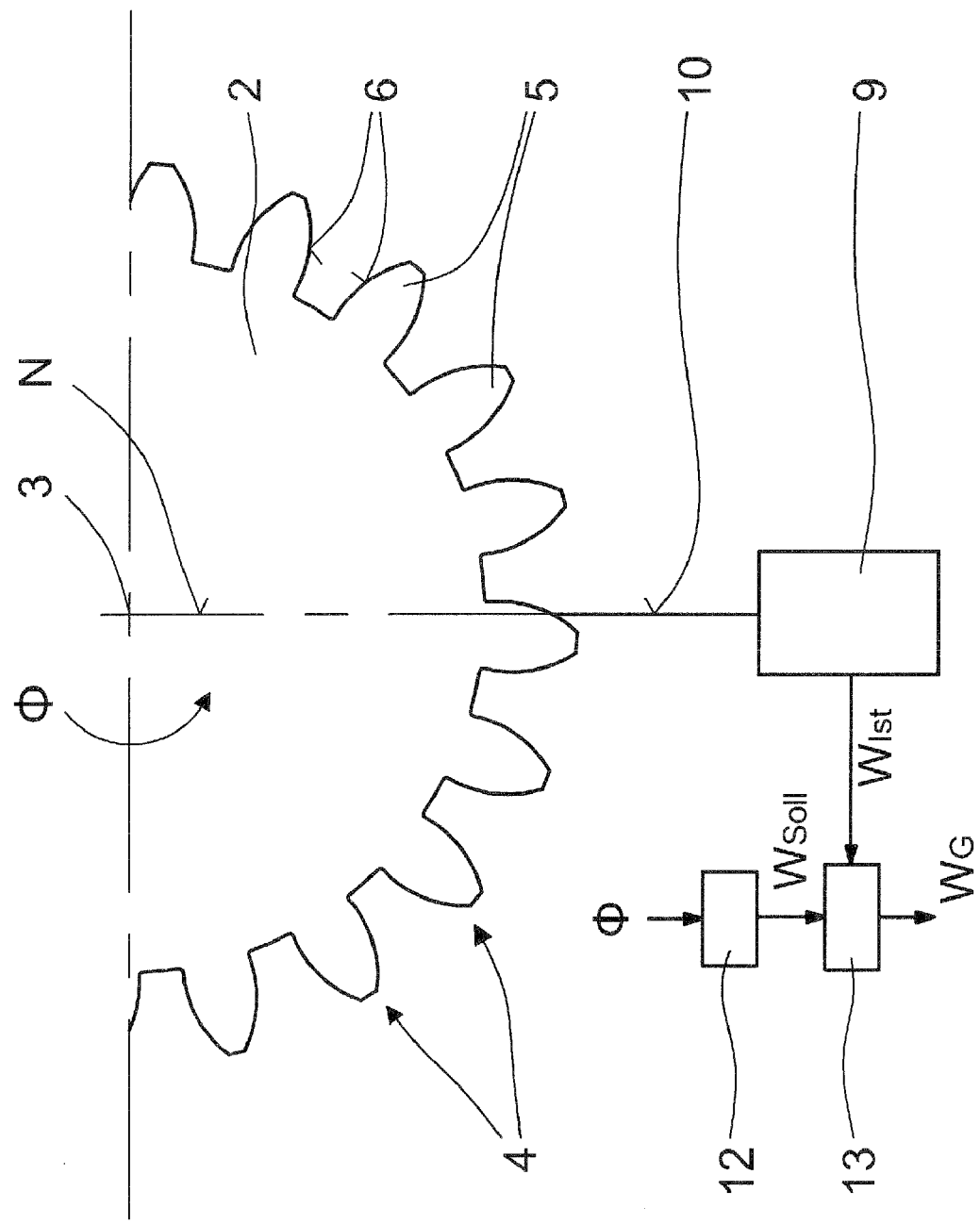

This application claims the priority of DE 10 2009 036 776.4 filed Aug. 8, 2009, which is incorporated by reference herein.

The invention relates to a method for the measurement of the stock of a gear with an axis of rotation which has to be finished in the hardened state, wherein the gear has a gearing with a plurality of teeth at its outer and/or inner circumference, wherein the teeth have, compared with the finished geometry, a stock on their tooth flanks, wherein the position of the surface of the tooth flank with the stock is detected by using optical distance measurement by means of a distance sensor, wherein a light beam is directed by the distance sensor onto the surface, and wherein the light beam is guided onto the surface in such a way that it is perpendicular to the axis of rotation or that it is parallel to this direction.

A method of this kind is disclosed in U.S. Pat. No. 4,547,674. There, the flanks of the teeth of a gear are measured by means of a laser distance sensor.

Especially in the production of gears the final hard finishing process has a major relevance. During this process the flanks of the teeth are machined e.g. by a grinding operation to bring them to the exact contour. An effective method for the production of a gear is the method of generative grinding by means of a grinding worm or the method of profile grinding with a profile grinding wheel.

Gearings of gears which are subject to such a hard finishing process after the hardening process to obtain the required precise geometry have normally deformations due to hardening. This results in the case of a respective magnitude of the deformation due to hardening especially when employing the discontinuous profile grinding process for hard finishing of the gear after the centering of the profile grinding wheel in the tooth space in a plurality of grinding passes without any contact between tool and work piece. If it is aimed to avoid such idle strokes the situation of the stock in each tooth space must be known.

It is known to measure the stock distribution by means of a caliper, i. e. in a touching manner. For doing so integrated calipers are employed in the hard finishing machine, e.g. in the profile grinding machine. However, it is a drawback here that the measuring times are relatively high. Accordingly, non-productive times results which reduce the cost effectiveness of the hard finishing process, especially of the grinding process.

It is thus an object of the invention to propose a method for the measurement of the stock of a gear by which the stock situation can be determined quicker but at the same time precisely. Thereby, it is another aspect of the invention to obtain a measurement result which is verified against measuring errors.

The method according to the invention is characterized in that at first the measurement of the position of the surface takes place so that the light beam is oriented in a direction, which is perpendicular to the axis of rotation, wherein a value of the position of the surface of the tooth flank which is detected by the distance sensor is subject of a plausibility check before use of the value, wherein the value is checked if it is within an expected range of values, wherein in the case that no plausible measured values are obtained or are expected the optical distance measurement occurs in a position in which the light beam is displaced by a defined distance parallel to the direction which is perpendicular to the axis of rotation.

By the mentioned alignment of the measurement beam a beneficial evaluation of the data becomes possible.

As under certain circumstances the measurement precision can be influenced, i. e. when the measurement beam impacts the surface of the tooth flank under a too acute angle, the invention provides that a value of the position of the surface of the tooth flank which is detected by the distance sensor and thus a value for the stock is subject of a plausibility check before use of the value, wherein the value is checked if it is within an expected range of values. Specifically it can be provided that the plausibility check occurs by comparing a measured value with a stored value or range of values. The measured value can be disallowed if it is not within the range of values. It can also be provided that a measured value is substituted by an interpolation or extrapolation from adjacent measured values if it is not within an allowed range of values.

In the case that no plausible measured values are obtained or are expected the optical distance measurement occurs in a position in which the light beam is displaced by a defined distance parallel to the direction which is perpendicular to the axis of rotation (i. e. parallel to a midplane which comprises the axis of rotation). The measurement in the displaced position occurs preferably by having moved a single distance sensor along a direction of translational movement into the displaced position. In general it is also possible that the measurement in the displaced position occurs by a separate distance sensor.

The light beam is preferably a laser beam. The optical distance measurement occurs preferably by the method of triangulation.

The mentioned method takes place especially prior a gear grinding operation, especially prior a discontinuous profile grinding operation.

The apparatus for the measurement of the stock of a gear with an axis of rotation which has to be finished in the hardened state is characterized in that it has a distance sensor, which is movable relatively to the gear to be measured in a direction which is perpendicular to a direction which is perpendicular to the axis of rotation (i. e. the translational movement of the distance sensor occurs perpendicular to a midplane of the gear which comprises the axis of rotation).

The apparatus can comprise a linear guiding with a linear scale for the translational displacement of the distance sensor. Furthermore, it can have memory means for storing of ranges of nominal values and can comprise a comparator for comparing of stored nominal values with measured values, wherein the comparator is connected with the memory means and the distance sensor.

Preferably, the apparatus has only one single distance sensor. It is preferably part of a gear grinding machine, especially of a discontinuous working profile grinding machine.

Optical measurement methods which work contact-free are significantly faster than mechanical measurement methods. The present invention takes advantage of this fact.

In optical systems in which the reflected light is evaluated the problem occurs that the quality of the measurement signal depends on the angle of the reflecting surface under which the measurement signal impacts the surface to be measured. In the case of gearings the impact angle becomes more and more acute when approaching the bottom of the gearing. From a certain limit angle a sufficiently precise measurement is not possible any more. To solve this problem the above mentioned plausibility check is proposed.

According to a first preferred embodiment of the invention the optical measurement system (distance sensor) is arranged in elongation of the mid axis of the gear. During the measurement process of the gear it is checked if the measured values are plausible. This plausibility check can be carried out prior the actual measurement as a calibration step or can take place during the measurement by comparing of the measured values with an expected range of values.

During the calibration step prior the actual measurement it is determined by using a calibration standard until which angle plausible measurement values can be obtained assuredly, i. e. until which limit angle assured measurement values can be obtained. During this measurement only measured values until this limit angle are processed, i. e. which are obtained by having a sufficient flat angle bigger than the limit angle (the angles are known from the geometry of the gearing). However, the online plausibility check will be necessary always because also other influences can cause measurement errors, e.g. dirt or oil drops.

As the result an information is obtained concerning the stock situation in each tooth space. Implausible values are disallowed or are substituted by interpolated or extrapolated values.

Another preferred embodiment of the invention proposes that the optical measurement system (distance sensor) is arranged in a position which is tangentially displaced from the mid axis of the gear. According to the tangential displacement (positive or negative) in each case a flank of the tooth of the gearing can be measured with improved measurement angles.

However, also here a measurement in the limit region can occur and thus measured values which are not usable can appear so that in this case the above explained method of the plausibility check can be employed.

In the drawings embodiments of the invention are illustrated.

Figure 2:
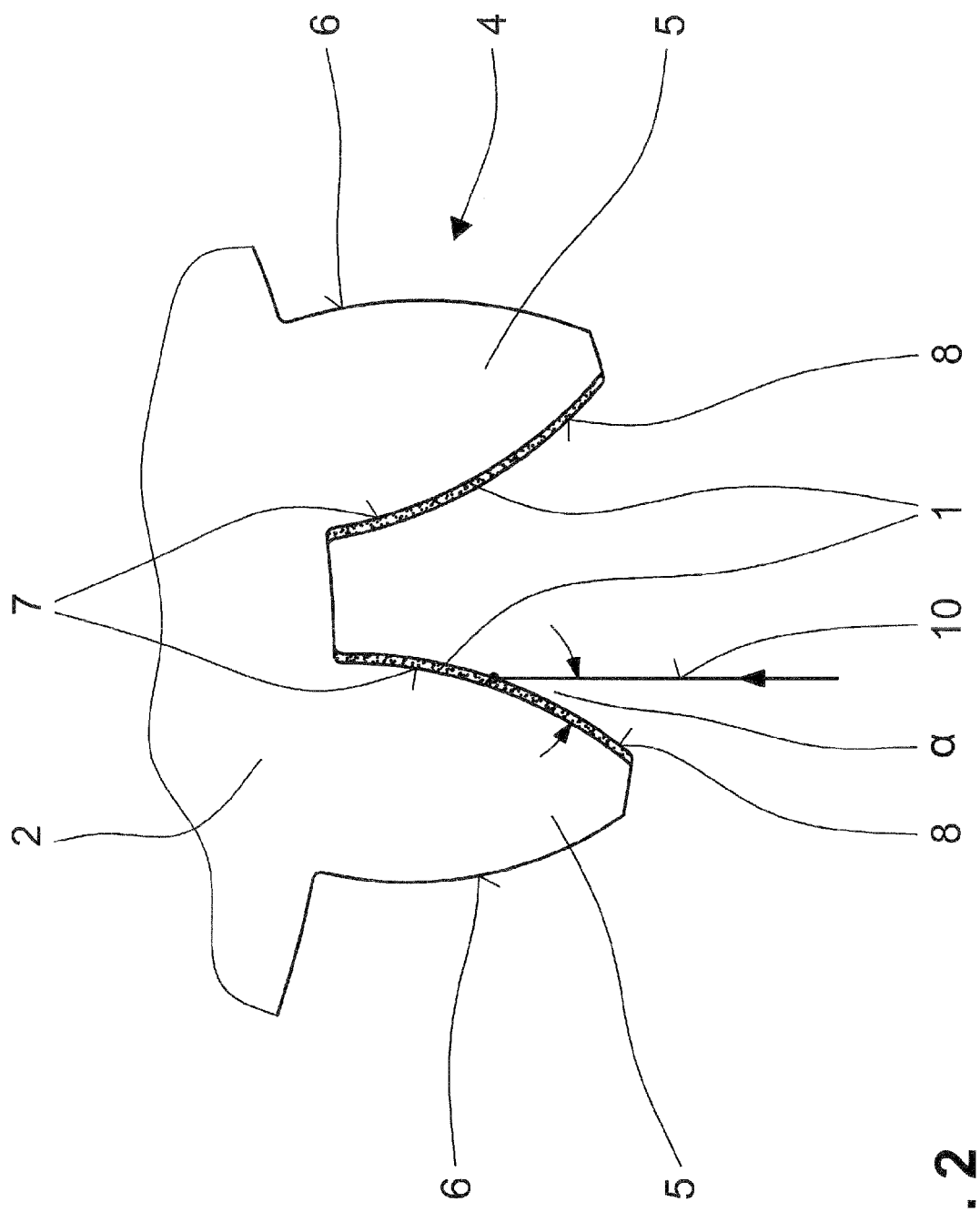
Figure 3:
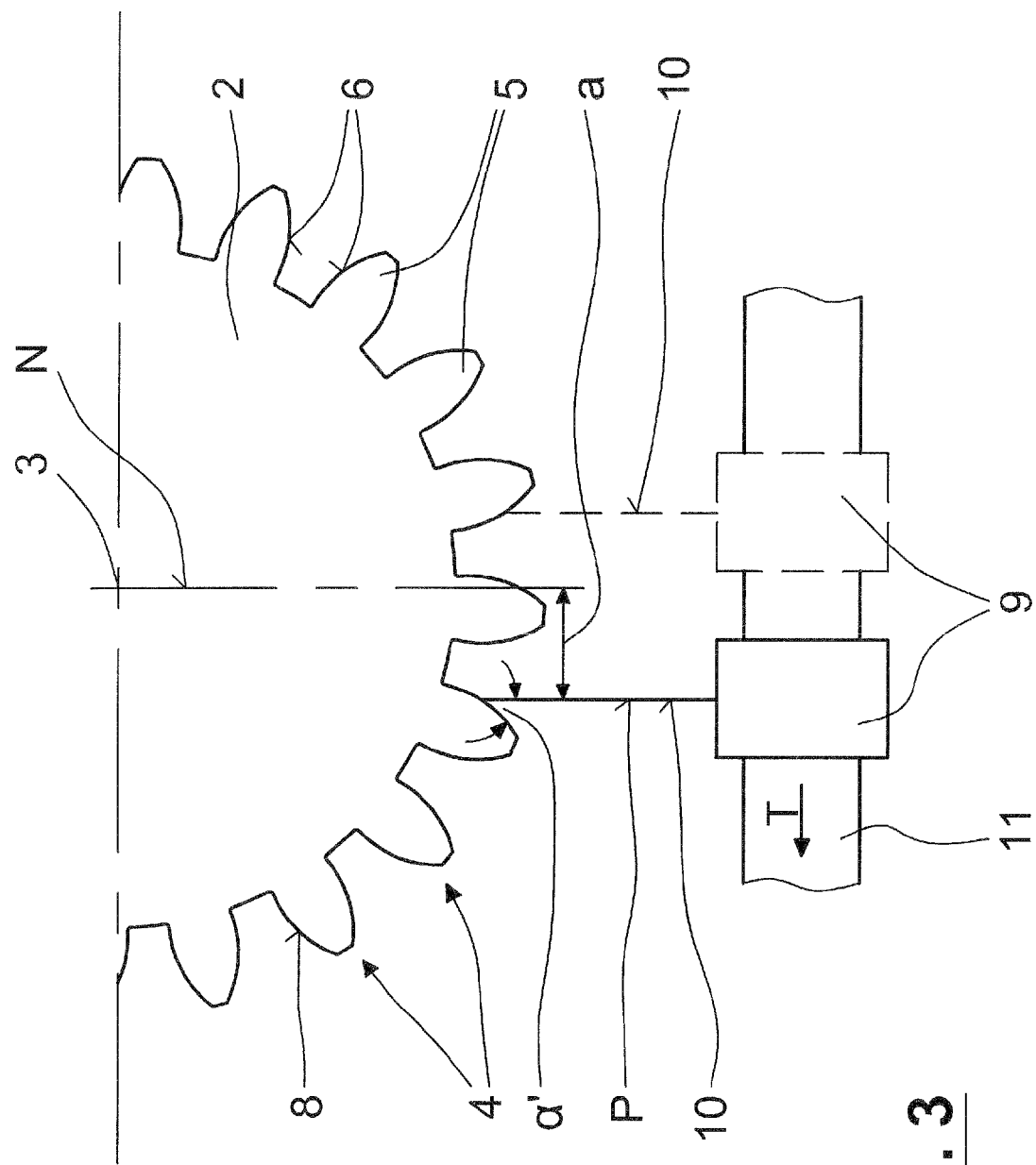

FIG. 1 shows schematically a top view of a gear which has to be measured with respect to its stock as well as a distance sensor for the measurement of the stock, FIG. 2 in an enlarged depiction of two adjacent teeth of the gear and the stock which is located on the tooth flanks and FIG. 3 in the depiction of FIG. 1 an alternative embodiment of the invention.

FIG. 1 shows schematically a gear 2 which is mounded on a workpiece spindle (not depicted), wherein the axis of the workpiece spindle is perpendicular on the plane of projection. This axis is nominated as axis of rotation 3. An outer gearing 4 is arranged at the outer circumference of the gear. Accordingly, the gear 2 has a plurality of teeth 5, which have respective tooth flanks 6. In the tooth gaps which are formed between two adjacent tooth flanks 6 a respective profiled grinding wheel is engaged during profile grinding in well known manner. As can be seen with the help of FIG. 2 in detail the two tooth flanks 6 have a grinding stock 1 which must be ground after the hardening of the gear 2 to obtain the finished geometry 7 of the tooth flank 6.

In the figures the situation of the measurement of a spur gear is shown in a simplified manner. The measurement takes place in an analogous way in the case of a helical gear and of an internal gearing respectively.

The knowledge of the stock situation, i. e. of the magnitude of the present stock 1 on each tooth flank 2 along the tooth height, is important for centering the gear 2 relatively to the grinding wheel in an optimal way. Furthermore, thereby the optimal grinding cycle can be defined, i. e. a grinding which can be carried out with a minimum of idle strokes without material removal.

Accordingly, the stock 1 on the tooth flanks 6 is determined in the following manner before the grinding operation:

The measurement of the stock takes place by means of a distance sensor 9 which emits a light beam 10. From the analysis of the reflected light the distance between the distance sensor 9 and the point of the surface 8 of the tooth flank 6 which has to be measured actually can be determined (see FIG. 2). Thereby, the light beam 10 is aligned in such a manner that it is directed in a direction N, which is perpendicular to the axis of rotation 3. I. e. the light beam 10 is arranged in a midplane of the gear 2 which also comprises the axis of rotation 3.

If the gear 2 is rotated by a rotation angle $\Phi$ around the axis of rotation 3 the tooth flank 6 can consequently be scanned along the tooth height and the respective stock can be measured.

If the light beam 10 (measurement beam) impacts a surface perpendicularly the measurement it optimal. However, it can be problematic if the light beam 10 (measurement beam) impacts the surface 8 under a too small angle $\alpha$ (see FIG. 2). In this case the measurement uncertainness is increased until finally no measurement is possible any more at all (angle $\alpha$ against zero degrees).

To eliminate this problem the invention suggests the following:

At one hand a plausibility check is proposed which is indicated in FIG. 1. For this memory means 12 are provided in which for each rotation angle $\Phi$ a nominal value $W_{Soll}$ including a tolerance band is stored for a specific gear 2. Accordingly, the nominal value $W_{Soll}$ defines in which range of values a value of the stock can be which is measured for an angle $\Phi$. The nominal value $W_{Soll}$ is forwarded to a comparator 13. The comparator obtains beside the nominal value $W_{Soll}$ also the actual measured value $W_{Ist}$ which is measured by the distance sensor 9. In the comparator 13 a comparison takes place if the actual measured value $W_{Ist}$ is within a range of values which is defined by the nominal value $W_{Soll}$ including a tolerance band. In this case the measured value is issued as checked value $W_G$ and is defined as being the stock value for the respective flank position.

However, if a measure value $W_{Ist}$ is not within the tolerance band according to the value $W_{Soll}$ it is concluded that a mismeasurement took place due to the above described measurement fuzziness. Consequently, the measured value $W_{Ist}$ is not usable.

In this case two possibilities are available: At the one hand the measured value can be disallowed as being not proper and a respective gap can be left in the course of the stock along the tooth height. On the other hand it is also possible to disallow the measured value and to substitute the same by a value which is deviated by an interpolation between adjacent values or by an extrapolation of values which are already measured and which have been found to be proper.

However, it exists still another possibility to reach usable measured values in the mentioned case, i. e. if the measured location has a too small angle $\alpha$ to the light beam 10. This is shown in FIG. 3.

Accordingly, the distance sensor 9 can be moved in a translational direction T on a linear guiding 11, wherein the translational direction T is perpendicular to the direction N; this means that the distance sensor 9 is displaced in such a manner that the light beam 10 is directed in a direction P parallel to the direction N. The distance by which the distance sensor 9 is moved from the midplane of the gear 2 is denoted with a. As can be seen from FIG. 3 the angle $\alpha'$ under which the light beam 10 impacts the surface 8 of the tooth flank 6 is significantly bigger, so that a usable measurement can take place.

With the knowledge that from a certain flank angle the mentioned problem of the fuzziness of the measurement appears generally is can also be provided that from a certain steepness of the flank the measurement takes place in the displaced position without carrying out the plausibility check. Of course this is done at both sides of the midplane of the gear 2 what is depicted in FIG. 3 by the distance sensor 9 in dashed lines. While the position of the distance sensor 9 shown with continuous lines is used for the right tooth flanks 6 in FIG. 3, the position of the distance sensor 9 shown with dashed lines is used for the measurement of the left tooth flanks 6.

The mentioned measurement by means of an optically working distance sensor 9 is known as such from different areas of technology. It is a matter of an electronic distance measurement with the help of running time measurement, of the measurement of the phasing or of the laser triangulation of light, wherein mostly a laser beam is employed. Active and passive optical distance measurement methods are inter alia the so-called light cutting method and the triangulation. The laser triangulation and the laser interferometer are preferred for short distances, the running time method is in contrast preferred for big distances so that it is here barely suitable.

For the running time measurement a light pulse is emitted. The running time of the pulse is the time which the light beam needs to be reflected to the source. By measurement of the running time the distance between source and object can be determined as the speed of light is known. The advantage of this method is the short reaction time. But the method has preferred working ranges between 1 meter until kilometers, so that it is not optimal for the present application. The problem here is the measurement of extreme short times. To reduce the requirements for the time measurement methods are used in which the laser beam is frequency modulated itself or is modulated with a high frequent signal.

The phase displacement of the light beam 10 which is reflected at the surface 8 or its modulation against the emitted beam or its modulation is dependent from the distance. This phase displacement is measured and is used to determine the covered distance. If the laser frequency itself is used for a superposition the device is working like a laser interferometer. Laser interferometer do not measure absolute distances but only the relative change when the object and a reference mirror respectively is displaced. When a mirror is displaced the sum of emitted and reflected beam is modulated periodically (so-called interference). The light beam passes by the displacement of a half of the length of the light wave through exactly one period. If the passes are counted and multiplied by the light wave length the wanted distance is obtained. By means of a precise evaluation of the signals a precision can be reached of about a hundredth of the wave length, i. e. for visible light a precision in the nanometer range. The benefit of this method is the higher resolution compared with the running time method which can be realized with lower requirements of the measuring technique.

A problem is the missing uniqueness of the signals for distances of a multiple of the half laser and modulation wave length respectively. This ambiguousness of interferometric methods can be circumvented with the help of a frequency modulation of the laser or of its high frequency modulation signal. Here, a running time component is implemented into the phase measurement.

In the case of laser triangulation the laser beam (in the case of lower requirements also only the radiation of a light emitting diode) is focused onto the object to be measured and is observed with a camera within the sensor. If the distance between the sensor and the object to be measured is changed also the angle is changed under which the light point is observed and thus the position of its image at the photo receiver. From the change of the position the distance from the laser projector to the object is calculated by means of the angle functions. This method is preferably employed presently.

LIST OF REFERENCE NUMERALS

1 Stock
2 Gear
3 Axis of rotation
4 Gearing
5 Tooth
6 Tooth flank
7 Finished geometry
8 Surface
9 Distance sensor
10 Light beam
11 Linear guiding
12 Memory means
13 Comparator
N Direction perpendicular to the axis or rotation
P Direction parallel to the direction N
T Direction of translational movement
a Distance
Φ Angle
α, α' Angle
$W_{Soll}$ Nominal value including tolerance band
$W_{Ist}$ Measured value
$W_G$ Checked value

The invention claimed is:

1. Method for the measurement of the stock of a gear with an axis of rotation which has to be finished in the hardened state, wherein the gear has a gearing with a plurality of teeth at its outer and/or inner circumference, wherein the teeth have, compared with the finished geometry, a stock on their tooth flanks, the method comprising:
   detecting the position of the surface of the tooth flank with the stock by using optical distance measurement by means of a distance sensor, wherein a light beam is directed by the distance sensor onto the surface, and wherein the light beam is guided onto the surface in a direction which is perpendicular to the axis of rotation or a direction which is parallel to the direction which is perpendicular to the axis of rotation,
wherein
at first the measurement of the position of the surface takes place so that the light beam is oriented in the direction which is perpendicular to the axis of rotation, wherein a value of the position of the surface of the tooth flank which is detected by the distance sensor is subject of a plausibility check before use of the value, wherein the value is checked if it is within an expected range of values, wherein in the case that no plausible measured values are obtained or are expected the optical distance measurement occurs in a position in which the light beam is displaced by a defined distance and in the direction which is parallel to the direction which is perpendicular to the axis of rotation.

2. Method according to claim 1, wherein the plausibility check occurs by comparing a measured value with a stored value.

3. Method according to claim 1, wherein a measured value is disallowed if it is not within the range of values.

4. Method according to claim 1, wherein the measurement in the displaced position occurs by having moved a single distance sensor along a direction of translational movement into the displaced position.

5. Method according to claim 1, the measurement in the displaced position occurs by a separate distance sensor.

6. Method according to claim 1, wherein the light beam is a laser beam.

7. Method according to claim 6, wherein the optical distance measurement occurs by the method of triangulation.

8. Method according claim 1, wherein it takes place prior to a gear grinding operation.

* * * * *